US012334026B2

(12) United States Patent
Hu et al.

(10) Patent No.: US 12,334,026 B2
(45) Date of Patent: Jun. 17, 2025

(54) BACKLIGHT DISPLAY CONTROL METHOD AND APPARATUS FOR ADJUSTING A BACKLIGHT POWER VALUE OF A REGION

(71) Applicant: HUAWEI TECHNOLOGIES CO., LTD., Guangdong (CN)

(72) Inventors: Wenlin Hu, Shenzhen (CN); Jun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/604,703

(22) Filed: Mar. 14, 2024

(65) Prior Publication Data

US 2024/0221691 A1 Jul. 4, 2024

Related U.S. Application Data

(63) Continuation of application No. PCT/CN2021/118554, filed on Sep. 15, 2021.

(51) Int. Cl.
*G09G 3/22* (2006.01)
*G06V 10/26* (2022.01)
(Continued)

(52) U.S. Cl.
CPC .......... *G09G 3/3426* (2013.01); *G06V 10/26* (2022.01); *G06V 10/462* (2022.01); *G06V 10/60* (2022.01);
(Continued)

(58) Field of Classification Search
CPC ...... G06V 10/26; G06V 10/462; G06V 10/60; G06V 10/80; G06V 2201/02;
(Continued)

(56) References Cited

U.S. PATENT DOCUMENTS

2012/0288139 A1 11/2012 Singhar
2014/0340437 A1 11/2014 Kohashikawa
(Continued)

FOREIGN PATENT DOCUMENTS

| CN | 105390096 A | 3/2016 |
|---|---|---|
| CN | 106339196 A | 1/2017 |
| EP | 2372686 B1 | 10/2014 |

OTHER PUBLICATIONS

Extended European Search Report issued in EP21957043.9, dated Oct. 2, 2024, 23 pages.
(Continued)

*Primary Examiner* — Sanghyuk Park

(57) ABSTRACT

A backlight display control method and apparatus are provided. The method includes: obtaining a fused image based on an input image; identifying a salient region and a non-salient region in the fused image; increasing a backlight power value of the salient region; and/or decreasing a backlight power value of the non-salient region. In this way, a region of interest that is for human eyes and that is in the image may be identified, the backlight power value and luminance distribution are controlled based on salience information, the backlight power value is dynamically allocated, and contrast of the region of interest for human eyes is maintained or improved, to improve quality of a displayed image under a same power value constraint; and backlight luminance is adjusted, without weakening image effect, to decrease or increase a backlight power value of a specific region, and thus improve contrast and lighting effect.

17 Claims, 7 Drawing Sheets

(51) Int. Cl.
*G06V 10/46* (2022.01)
*G06V 10/60* (2022.01)
*G06V 10/80* (2022.01)
*G09G 3/34* (2006.01)

(52) U.S. Cl.
CPC .......... *G06V 10/80* (2022.01); *G06V 2201/02* (2022.01); *G06V 2201/07* (2022.01); *G09G 2320/062* (2013.01); *G09G 2320/066* (2013.01); *G09G 2320/0686* (2013.01)

(58) Field of Classification Search
CPC ............. G06V 2201/07; G09G 3/3426; G09G 2320/066; G09G 2320/0686
See application file for complete search history.

(56) References Cited

U.S. PATENT DOCUMENTS

| | | |
|---|---|---|
| 2016/0110854 A1 | 4/2016 | Kohashi |
| 2020/0195875 A1* | 6/2020 | Berkovich ............. G06V 10/25 |
| 2022/0319443 A1* | 10/2022 | Hiramatsu ........... G09G 3/3413 |

OTHER PUBLICATIONS

International Search Report and Written Opinion issued in PCT/CN2021/118554, dated May 26, 2022. 12 pages.

\* cited by examiner

BACKLIGHT DISPLAY CONTROL METHOD AND APPARATUS FOR ADJUSTING A BACKLIGHT POWER VALUE OF A REGION

CROSS-REFERENCE TO RELATED APPLICATION

This application is a continuation of International Application No. PCT/CN2021/118554, filed on Sep. 15, 2021. The disclosure of the aforementioned application is incorporated herein by reference in its entirety.

TECHNICAL FIELD

Embodiments of this application relate to the field of artificial intelligence (AI), and in particular, to a backlight display control method and apparatus.

BACKGROUND

In a conventional liquid crystal display (LCD), a liquid crystal molecule cannot emit light, and a backlight source is needed for viewing content displayed on an LCD panel. An LCD screen display principle is that when an LED backlight is turned on, an RGB attribute value of each pixel on the screen is used to control and adjust transmitted light flux of red, green, and blue color components. In this way, a colorful picture is displayed on the screen based on a principle of mixing three primary colors. Because luminance of the backlight cannot be adjusted in this process, a conventional LCD screen has the following disadvantages: a large power value, low image contrast, and inevitable light leakage.

In a conventional technology, a local dimming (local dimming) algorithm is introduced. This technology is mainly used to control luminance of the backlight source of the display and enable, through pixel compensation, a displayed picture not to be distorted after an adjustment, to improve dynamic contrast of the picture and decrease the power value for energy saving. The local dimming algorithm is classified by backlight dimensions as follows: 0-dimensional dimming (0D dimming) that is uniform dimming (uniform dimming); 1-dimensional dimming (1D dimming) that is line dimming (line dimming); and 2-dimensional dimming (2D dimming) that is local dimming (local dimming). The 0D dimming is basically a specification of every display, and is mainly used to pass a national energy efficiency test and decrease a power value. However, the 0D dimming generally cannot improve the contrast of a picture and does not greatly improve quality of the displayed picture. The 2D dimming generally needs a backlight constant current board to control 2D local backlight. This needs extra costs.

The local dimming algorithm is used to obtain, with reference to mainly image content corresponding to a current zone of the displayed picture, a backlight power value to control backlight luminance. The luminance of the backlight is directly proportional to the power value. Generally, higher overall luminance of the picture indicates a greater backlight power value, that is, needs a greater power value. When the backlight power value is greater than a rated power value of a backlight module, backlight luminance needs to be reduced. However, reducing overall backlight luminance may affect image effect. When the backlight power value is less than the rated power value of the module, a part of a remaining power value is not effectively used. Therefore, a problem about how to adjust the backlight luminance, without weakening image effect, to decrease or increase a backlight power value of a specific region, and thus improve contrast and lighting effect needs to be urgently alleviated and resolved.

SUMMARY

To resolve the foregoing problem, embodiments of this application provide a backlight display control method and apparatus.

According to a first aspect, an embodiment of this application provides a backlight display control method. The method includes: obtaining a fused image based on an input image; identifying a salient region and a non-salient region in the fused image; increasing a backlight power value of the salient region; and/or decreasing a backlight power value of the non-salient region. In this way, a region of interest that is for human eyes and that is in the image may be identified, the backlight power value and luminance distribution are controlled based on salience information, the backlight power value is dynamically allocated, and contrast of the region of interest for human eyes is maintained or improved, to improve quality of a displayed image under a same power value constraint; and backlight luminance is adjusted, without weakening image effect, to decrease or increase a backlight power value of a specific region, and thus improve contrast and lighting effect.

In a feasible implementation, the obtaining a fused image based on an input image includes: detecting the input image according to a conventional saliency detection algorithm to obtain a first detection result; detecting the input image according to an artificial intelligence (AI) information identification algorithm to obtain a second detection result; and obtaining the fused image based on the first detection result and the second detection result. In this way, the region of interest that is for human eyes and that is in the image can be identified by using artificial intelligence information, and a weight and contrast of a high luminance pixel of the image can be adjusted according to the conventional saliency detection algorithm, to obtain the fused image.

In a feasible implementation, the detecting the input image according to a conventional saliency detection algorithm to obtain a first detection result includes: detecting low-level prior information and/or high-level prior information in the input image according to the conventional saliency detection algorithm, and outputting the first detection result, where the low-level prior information includes at least one of the following: contrast prior information or spatial location prior information, and the high-level prior information includes at least one of the following: a human face, a text, and an object. In this way, content of interest that is for human eyes and that is in the input image can be identified.

In a feasible implementation, the detecting the input image according to an AI information identification algorithm to obtain a second detection result includes: detecting a salient target in the input image according to the AI information identification algorithm, segmenting the salient target, and retaining edge information of the salient target, to obtain the second detection result. In this way, a region in which the salient target in the input image is located can be identified.

In a feasible implementation, the obtaining the fused image based on the first detection result and the second detection result includes: determining a first weight value of a high luminance pixel in the first detection result; determining a second weight value of a high luminance pixel in the second detection result; and adjusting a weight value of a high luminance pixel based on the first weight value and the second weight value, to obtain the fused image. In this way, the weights of the high luminance pixels obtained by using the two detection methods may be fused, and based on the fused weights, luminance processing is performed on a main region and a background region, to obtain the fused image that has a clear edge and that can show an image content feature.

In a feasible implementation, the identifying a salient region and a non-salient region in the fused image includes: determining luminance distribution of the input image; adjusting a first salience value of each pixel of the fused image based on the luminance distribution to obtain a second salience value; adding second salience values of a plurality of pixels in a specified region in the fused image together and calculating an average value to obtain a block salience value of the specified region, where there are a plurality of specified regions; determining the salient region in the fused image based on the block salience value of the specified region; and determining the non-salient region based on the salient region in the fused image. In this way, salience value distribution of the fused image may be adjusted based on the luminance distribution of the input image to obtain block salience value information, and the salient region and the non-salient region in the fused image are segmented, to facilitate control of the backlight power value and the luminance distribution.

In a feasible implementation, the adjusting a first salience value of each pixel of the fused image based on the luminance distribution of the input image to obtain a second salience value includes: determining the luminance distribution of the input image; performing weighted averaging based on the luminance distribution and a preset luminance-weight curve to obtain a salience gain-luminance distribution adjustment curve, where the luminance distribution includes weight values of low, medium, and high luminance; obtaining a salience gain value of each pixel based on the salience gain-luminance distribution adjustment curve, where the salience gain value is used to increase or decrease a salience value of each pixel, and the salience value of each pixel is a salient degree of a single pixel relative to the overall image; and increasing or decreasing the first salience value of each pixel of the fused image based on the salience gain value to obtain the second salience value of each pixel. In this way, luminance distribution of the fused image can be adjusted to obtain the second salience value of each pixel.

In a feasible implementation, the increasing a backlight power value of the salient region includes: determining a first backlight power value based on the input image; and in a case in which the first backlight power value is less than a rated total backlight power value, adding a remaining power value to the salient region, where the remaining power value is a difference between the first backlight power value and the rated total backlight power value. In this way, the remaining power value may be allocated to a plurality of salient regions based on a proportion of the block salience value, and the backlight power values of the regions are increased, to improve contrast and lighting effect.

In a feasible implementation, the decreasing a backlight power value of the non-salient region includes: determining the first backlight power value based on the input image; and in a case in which the first backlight power value is greater than the rated total backlight power value, decreasing the backlight power value of the non-salient region, and maintaining the backlight power value of the salient region. In this way, contrast and lighting effect can be improved in a case in which luminance of the salient region is not reduced.

In a feasible implementation, the determining a first backlight power value based on the input image includes: determining the first backlight power value based on a sum of current backlight power values of the input image. In this way, a pre-output backlight power value can be determined.

In a feasible implementation, the decreasing a backlight power value of the non-salient region includes: obtaining a luminance gain value based on an average luminance value of the input image and a first preset curve, where the first preset curve is a luminance-luminance gain value adjustment curve; obtaining the salience gain value based on the block salience value of the input image and a second preset curve, where the second preset curve is a salience value-salience gain value adjustment curve; determining a backlight decreasing intensity based on the luminance gain value and the salience gain value; obtaining a backlight adjustment value based on a current backlight power value of the non-salient region and a third preset curve, where the third preset curve is a backlight power value-backlight gain value adjustment curve; and decreasing the backlight power value of the non-salient region based on the backlight adjustment value and the backlight decreasing intensity. In this way, the backlight decreasing intensity may be obtained through calculation by using the luminance gain value and the salience gain value, and the backlight power value of the non-salient region may be decreased based on the backlight decreasing intensity.

In a feasible implementation, the decreasing a backlight power value of the non-salient region includes: determining a second backlight power value; and in a condition in which the second backlight power value is greater than the rated backlight power value, decreasing the backlight power value of the non-salient region based on a ratio of the second backlight power value to the rated backlight power value. In this way, in a case in which the rated total power value is exceeded, a current may be reduced locally to drive backlight, to keep luminance of a salient region in an image unchanged. Luminance of the non-salient region is reduced and contrast is improved.

According to a second aspect, an embodiment of this application provides a backlight display control apparatus, including an image post-processing module, configured to: obtain a fused image based on an input image, and identify a salient region and a non-salient region in the fused image; and a power consumption control module, configured to increase a backlight power value of the salient region and/or decrease a backlight power value of the non-salient region.

In a feasible implementation, the image post-processing module includes: a region identification unit, configured to: determine luminance distribution of the input image; adjust a first salience value of each pixel of the fused image based on the luminance distribution to obtain a second salience value; add second salience values of a plurality of pixels in a specified region in the fused image together and calculate an average value to obtain a block salience value of the specified region, where the specified region is a region corresponding to each backlight unit in a backlight module, and there are a plurality of specified regions; determine the salient region in the fused image based on the block salience value of the specified region; and determine the non-salient region based on the salient region in the fused image.

In a feasible implementation, the power consumption control module includes: a first backlight statistics collection unit, configured to obtain a first backlight power value based on the luminance distribution of the input image; a first control unit, configured to: in a case in which the first backlight power value is less than a rated total backlight power value, add a remaining power value to the salient region, where the remaining power value is a difference between the first backlight power value and the rated total backlight power value; and a second control unit, configured to: in a case in which the first backlight power value is greater than the rated total backlight power value, decrease the backlight power value of the non-salient region and maintain the backlight power value of the salient region.

In a feasible implementation, the power consumption control module further includes: a second backlight statistics collection unit, configured to determine a second backlight power value; and a third control unit, configured to: in a condition in which the second backlight power value is greater than the rated backlight power value, decrease the backlight power value of the non-salient region based on a ratio of the second backlight power value to the rated backlight power value.

According to a third aspect, an embodiment of this application provides an electronic device, including: at least one memory, configured to store a program; at least one processor, configured to execute the program stored in the memory; and a backlight module, configured to enable backlight, where the backlight module is connected to the processor through a transmission interface, and the backlight module includes a plurality of backlight units; and when the program stored in the memory is executed, the processor is configured to perform the method according to any one of the first aspect, so that the plurality of backlight units enable backlight in a corresponding region.

According to a fourth aspect, an embodiment of this application provides a computer storage medium. The computer storage medium stores instructions, and when the instructions are run on a computer, the computer is enabled to perform the method according to any one of the first aspect.

According to a fifth aspect, an embodiment of this application provides a computer program product including instructions. When the instructions are run on a computer, the computer is enabled to perform the method according to any one of the first aspect.

According to a sixth aspect, an embodiment of this application provides a backlight display control apparatus, including a processor and a transmission interface. The processor receives or sends data through the transmission interface; and the processor is configured to invoke program instructions stored in a memory, to enable the control apparatus to implement the method according to any one of the first aspect.

An embodiment of this application provides a display control method. A region of interest for human eyes is identified with reference to AI information, and backlight distribution is dynamically adjusted within a rated range of a backlight power value. Pixel-level salience values corresponding to backlight zones are averaged to obtain a corresponding block-level salience value. When a pre-output total backlight power value is less than a rated total backlight power value, a remaining power value is allocated to a salient region based on image salience information to improve backlight luminance. When a pre-output backlight power value is greater than a rated backlight power value, luminance of a non-salient region is reduced and performance of the salient region is maintained.

BRIEF DESCRIPTION OF DRAWINGS

To describe technical solutions of a plurality of embodiments disclosed in this specification more clearly, the following briefly describes the accompanying drawings used in describing the embodiments. Clearly, the accompanying drawings in the following description show merely the plurality of embodiments disclosed in this specification, and a person of ordinary skill in the art may still derive other drawings from these accompanying drawings without creative efforts.

The following briefly describes accompanying drawings that need to be used in descriptions of embodiments or a conventional technology.

DESCRIPTION OF EMBODIMENTS

Figure 1:
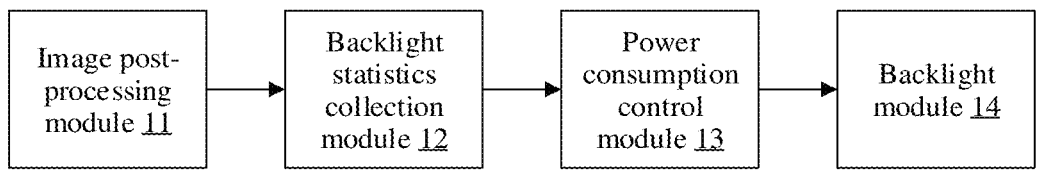
FIG. 1 is a diagram of a system architecture of a backlight display control method according to an embodiment of this application.

The following descriptions relate to "some embodiments" that describe subsets of all possible embodiments, but it may be understood that "some embodiments" may be the same or different subsets of all the possible embodiments and may be combined with each other without conflict.

In the following descriptions, terms "first, second, third, and the like", or a module A, a module B, a module C, and the like are merely used to distinguish between similar objects, and do not represent a specific order of the objects. It may be understood that specific orders or sequences may be interchanged if allowed, so that embodiments of this application described herein can be implemented in an order other than the orders shown or described herein.

In the following descriptions, involved reference numerals such as step S110, step S120, and the like that indicate steps do not necessarily indicate that the steps are to be performed based on the order, and consecutive steps may be transposed if allowed, or may be performed simultaneously.

It should be understood that in this application, "at least one (item)" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including any combination of a singular item (piece) or plural items (pieces). For example, at least one item (piece) of a, b, or c may indicate a, b, c, "a and b", "a and c", "b and c", or "a, b, and c", where a, b, and c may be singular or plural.

Unless otherwise defined, all technical and scientific terms used in this specification have same meanings as terms usually understood by a person skilled in the art of this application. The terms used in this specification are merely intended to describe embodiments of this application, and are not intended to limit this application.

The following describes technical solutions in embodiments of this application with reference to accompanying drawings in embodiments of this application.

A first solution is a backlight adjustment method. First, a location of a main object in an image picture is detected to determine a main region, and then hue curve adjustment is performed on the image, so that the main region is brighter or a background region relative to the main region is darker. Then, adaptive dynamic contrast improvement is separately performed on the main region and the background region, and finally the two regions are fused. This technology can highlight the main region in the image. Because the main region and the background region are processed separately, after the two regions are fused, a contour (contour) ripple is likely to appear at an edge, and a picture flicker is likely to appear in time domain.

A second solution is a backlight adjustment method based on power consumption control. A backlight system is initialized during power-on, a luminance signal of an image in each zone of a picture is collected, a pre-drive current value and a pre-output total power value are calculated based on the luminance signal of the image, and the pre-output total power value is compared with a target power value. When the pre-output total power value is less than the target power value, a target region is enabled by using a pre-drive current. When the pre-output total power value is greater than the target power value, the target power value is compared with the pre-output total power value to obtain a ratio, the pre-drive current value is multiplied by the ratio obtained through calculation to decrease the pre-drive current, and then the target region is enabled. In this solution, a power consumption control manner is used, and a magnitude of the pre-drive current is controlled through a comparison between the pre-output total power value and a total target power value. The control manner is irrelevant to an image content feature. When an overall image is in a dark scene, the pre-output total power value is less than the total target power value, and backlight is driven by using a high current.

As a result, an overall picture is bright and contrast is reduced. When an overall image is in a bright scene, the pre-output total power value is greater than the total target power value, and a current is globally reduced to drive backlight. As a result, luminance of an overall picture is reduced and contrast is reduced accordingly. This solution ignores the image content feature and only improves or reduces backlight luminance globally.

The foregoing two solutions do not consider problems of how to dynamically allocate a backlight power value based on a region of interest that is for human eyes and that is in a picture, and how to use a remaining power value to increase a backlight power value of a specific region under a power value constraint and improve contrast and lighting effect of the specific region, to improve image quality when the backlight power value is less than a rated power value.

An embodiment of this application provides a backlight display control method. A backlight power value and luminance distribution are controlled based on salience information. A region of interest that is for human eyes and that is in an image is identified by using artificial intelligence (AI) information, the backlight power value is dynamically allocated, and contrast of the region of interest for human eyes is maintained or improved, to improve quality of a displayed image under a same power value constraint.

The backlight display control method provided in embodiments of this application is applicable to a system on chip (SOC) of a television product chip and a time control TCON) module of a PC display chip. A key control function is currently implemented by hardware, and can also be implemented by software.

FIG. 1 is a diagram of a system architecture of a backlight display control method according to an embodiment of this application. As shown in FIG. 1, the system architecture includes an image post-processing module 11, a backlight statistics collection module 12, a power consumption control module 13, and a backlight module 14.

The image post-processing module 11 obtains an input image, processes the input image by using a conventional saliency detection algorithm and an AI information identification algorithm to obtain a fused image, and obtains block salience value information corresponding to each backlight unit in the backlight module 14 through calculation based on luminance distribution of the input image and the fused image. A block salience value indicates at least one salient region in the input image.

In a possible implementation, the backlight module 14 includes a plurality of backlight units.

The backlight statistics collection module 12 collects statistics on a pre-output total backlight power value of the backlight module 14 based on the input image, and denotes the pre-output total backlight power value as a first backlight power value.

The power consumption control module 13 adaptively allocates, based on a result of a comparison between the first backlight power value and a rated total backlight power value, a backlight power corresponding to the at least one salient region. For example, in a case in which the pre-output total backlight power value is less than the rated total backlight power value, a remaining power value is added to the at least one salient region, to obtain an adjusted pre-output backlight power value of the backlight module 14; and in a case in which the pre-output total backlight power value is greater than the rated total backlight power value, a backlight power value of a non-salient region is decreased, and a backlight power value of the salient region is maintained. The adjusted pre-output backlight power value of the backlight module 14 is denoted as a second backlight power value, and the remaining power value is a difference between the first backlight power value and the rated total backlight power value.

The backlight module 14 enables, based on the second backlight power value, backlight corresponding to each backlight unit.

Based on the foregoing system architecture, an embodiment of this application provides a backlight display control method, including obtaining a fused image based on an input image; identifying a salient region and a non-salient region in the fused image; increasing a backlight power value of the salient region; and/or decreasing a backlight power value of the non-salient region.

Figure 2:
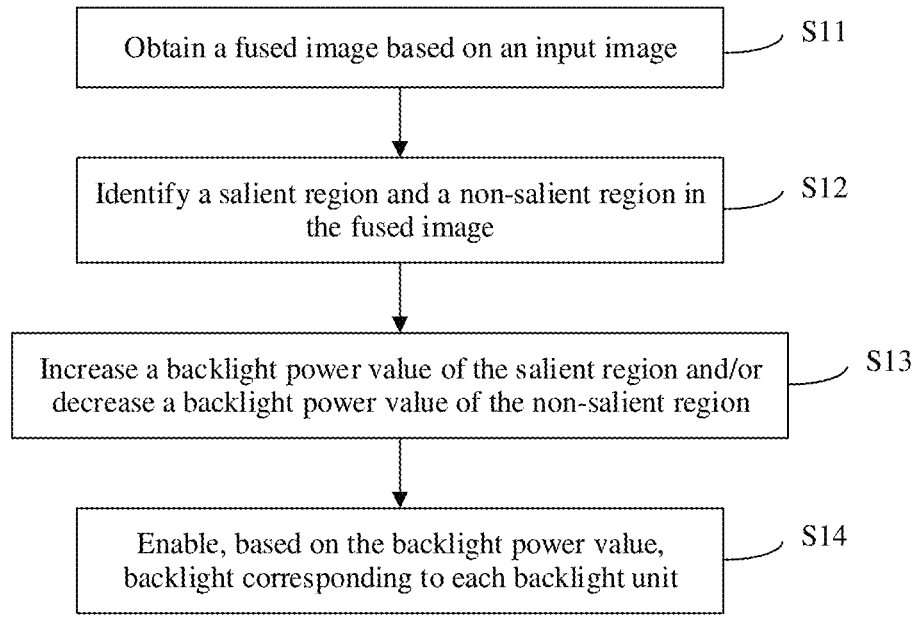
FIG. 2 is a flowchart of a backlight display control method according to an embodiment of this application.

FIG. 2 is a flowchart of the backlight display control method according to an embodiment of this application. As shown in FIG. 2, a procedure of the backlight display control method provided in this embodiment of this application is as follows.

Step S11: Obtain an input image, and fuse a conventional saliency detection algorithm and an AI information identification algorithm to process the input image to obtain a fused image; and obtain, based on luminance distribution of the input image and the fused image, a block salience value of a region corresponding to each backlight unit in a backlight module. A block salience value corresponding to each region indicates a salient region and/or a non-salient region in the input image.

Step S12: Before performing power consumption control on the salient region and/or the non-salient region, collect statistics on a pre-output total backlight power value of the backlight module 14 based on the input image, to obtain a first backlight power value.

Step S13: Increase a backlight power value of the salient region and/or decrease a backlight power value of the non-salient region based on a result of a comparison between the first backlight power value and the rated total backlight power value.

When step S13 is performed, in a case in which the first backlight power value is less than the rated total backlight power value, a remaining power value is added to at least one salient region, to obtain a second backlight power value pre-output by the backlight module, where the remaining power value is a difference between the first backlight power value and the rated total backlight power value; and in a case in which the first backlight power value is greater than the rated total backlight power value, a backlight power value of at least one non-salient region may be further decreased, and a backlight power value of at least one salient region is maintained, to obtain a second backlight power value pre-output by the backlight module.

Step S14: The backlight module enables, based on the second backlight power value, backlight corresponding to each backlight unit.

Based on the backlight display control method provided in this embodiment of this application, a region of interest for human eyes is effectively identified based on AI detection information, and with reference to a conventional saliency detection technology, the backlight power value is adaptively allocated to adjust the pre-output backlight power value of the backlight module. When the pre-output backlight power value is less than the rated backlight power value, contrast of the salient region is improved to improve image quality performance. When the pre-output backlight power value is greater than the rated backlight power value, luminance of the non-salient region is reduced to maintain performance of the salient region. This minimizes an image quality loss that can be perceived by human eyes. By using the backlight display control method provided in this embodiment of this application, the backlight module can improve contrast of the region of interest under a power value constraint to improve image quality experience.

Compared with the first solution, in the backlight display control method provided in this embodiment of this application, backlight performance is dynamically adjusted based on a power value, and side effect such as a contour ripple, or the like does not occur.

Compared with the second solution, in the backlight display control method provided in this embodiment of this application, the salient region in the image is identified by using an AI technology, and the backlight power value is adaptively allocated to the salient region, so that the power value constraint can be satisfied, and image quality performance of the salient region can be effectively improved, to show a content feature of a target image.

Figure 3:
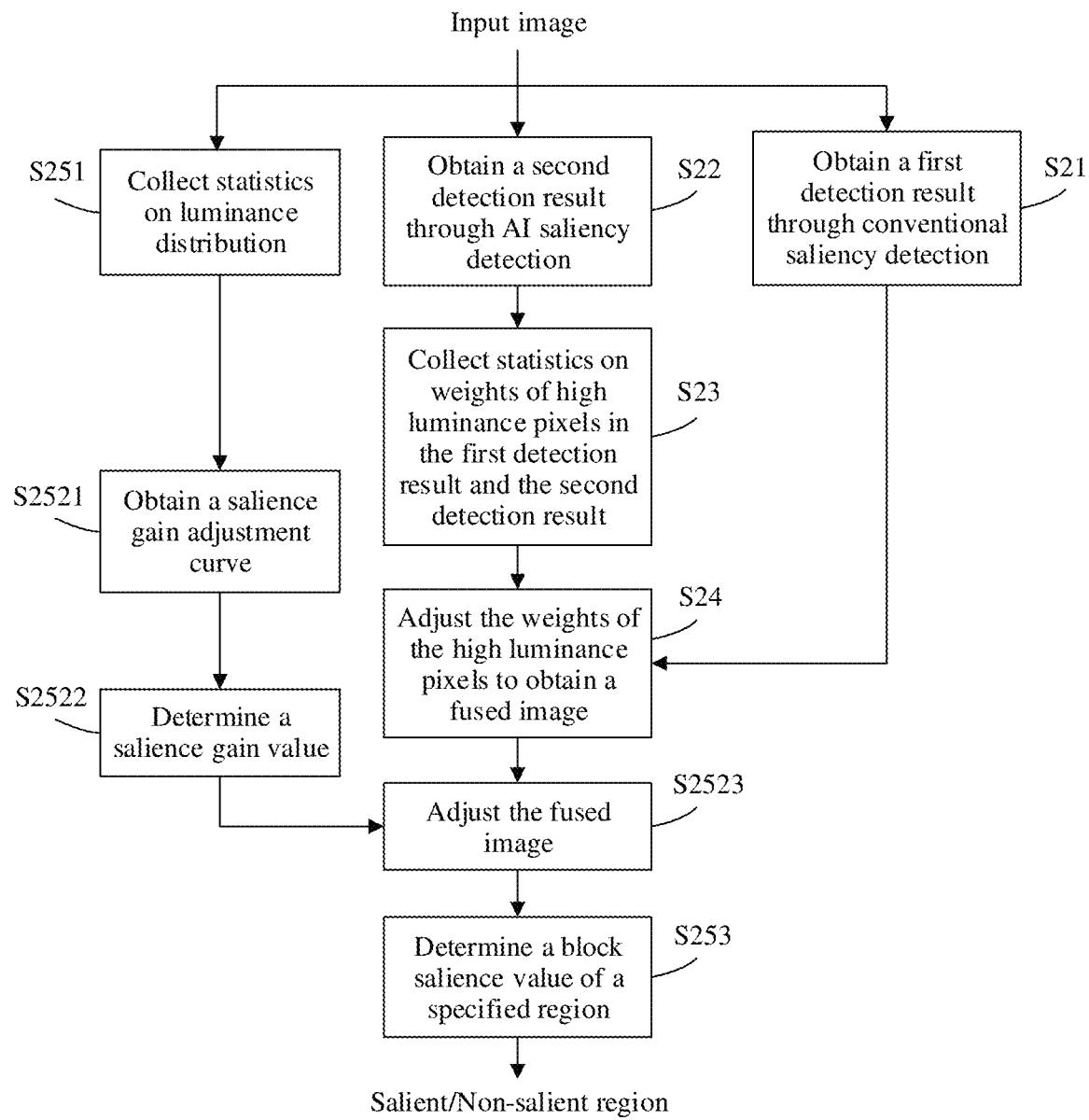
FIG. 3 is a flowchart of fusing a conventional saliency detection algorithm and an AI information identification algorithm to process an image in a backlight display control method according to an embodiment of this application.

FIG. 3 is a flowchart of fusing the conventional saliency detection algorithm and the AI information identification algorithm to process the image in the backlight display control method according to an embodiment of this application. As shown in FIG. 3, in step S11 of the backlight display control method provided in this embodiment of this application, steps S21 to S25 may be performed, so that image processing is performed to obtain block salience value information.

Step S21: Detect the input image according to the conventional saliency detection algorithm to obtain a first detection result.

The conventional saliency detection algorithm is used to predict eye-fixation (Eye-fixation), that is, to detect a region in which human eyes are most interested in a period of time when the human eyes focus on an image in a natural scene.

In a feasible implementation, the input image is obtained, and the input image is processed according to the conventional saliency detection algorithm, to obtain a corresponding conventional salient image. The conventional salient image may be denoted as the first detection result.

Figure 4A:
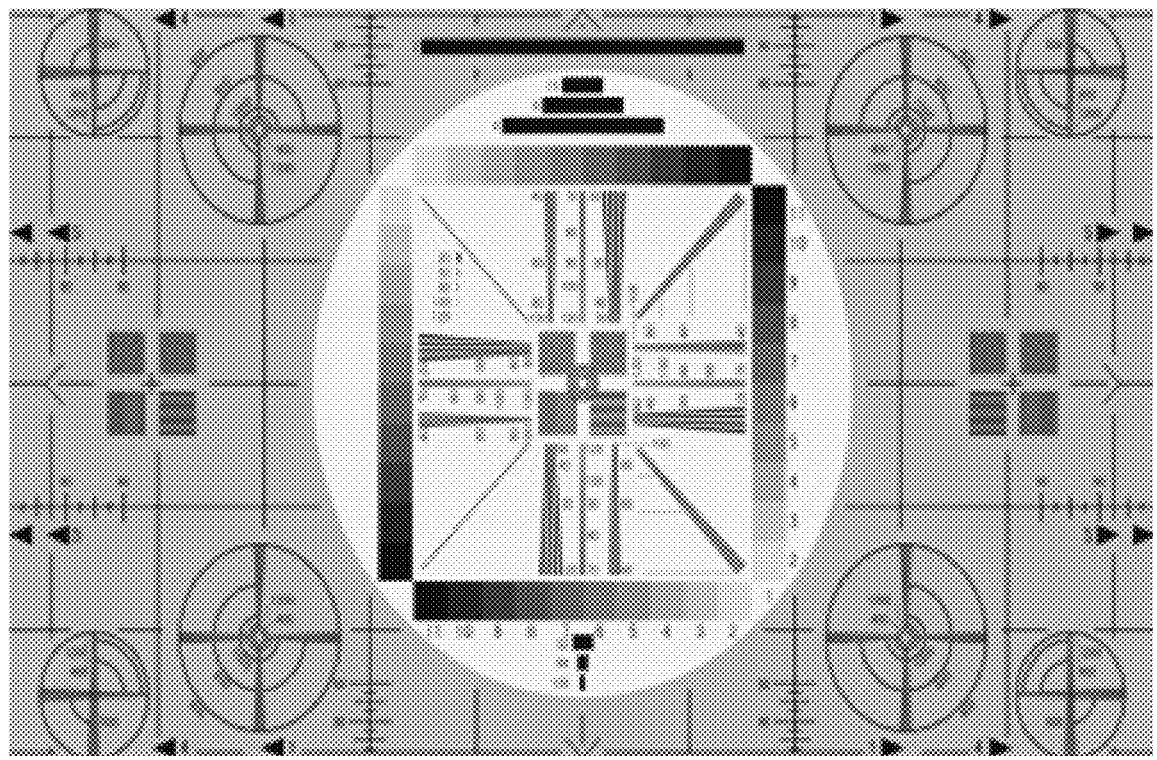
FIG. 4A is a schematic diagram of an input image in a backlight display control method according to an embodiment of this application.
Figure 4B:
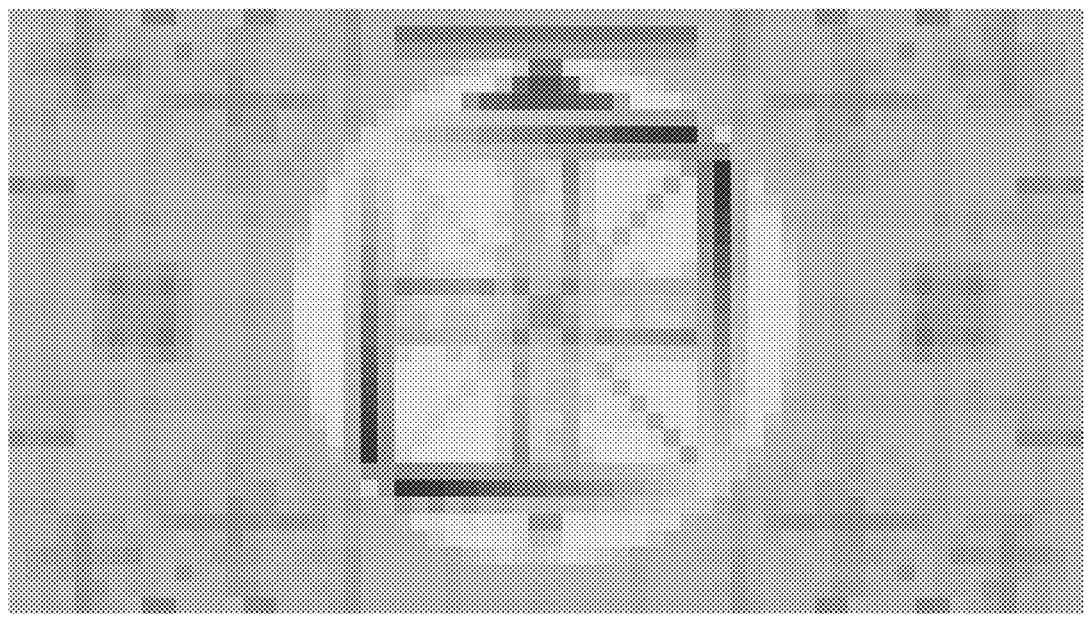
FIG. 4B is a schematic diagram of a first detection result obtained after the input image shown in FIG. 4A is detected according to a conventional saliency detection algorithm.

For example, the input image detected according to a conventional saliency detection algorithm model is shown in FIG. 4A, and the obtained conventional salient image is shown in FIG. 4B. The conventional salient image has a low-level feature of the input image, for example, a color, an intensity, a direction, and the like.

In a feasible implementation, the conventional saliency detection algorithm may further obtain the conventional salient image based on low-level prior information such as contrast, a spatial location, and the like of the input image and high-level prior information such as a human face, a text, and the like.

For example, the low-level prior information includes contrast prior information, center prior information, and background prior information.

For example, if a pixel of or a region in the input image has a feature such as luminance, a color, and the like that is significantly different from a feature of another region, there is a high probability that the pixel or the region is the salient region. In this case, a salient feature such as luminance, a color, and the like of the pixel or the region compared with the feature of another region is the contrast prior information. A weight value of the contrast prior information may be increased in the conventional saliency detection algorithm model.

For example, based on an analysis of a gaze system of human eyes, there is a high probability that a region close to a center of the input image is the salient region, and a feature of the center of the input image is the center prior information. The weight value of the center prior information may be increased in the conventional saliency detection algorithm model.

For example, a background region in the input image is generally connected to an edge, there is a high probability that a pixel region connected to an image edge is a background region, and a feature of the background region is the background prior information. The weight value of the background prior information may be increased in the conventional saliency detection algorithm model.

The high-level prior information is used to extract some high-level target information based on a computer vision technology to assist in saliency detection. The high-level target information includes information such as a human face, a target edge, a text, and the like.

For example, for an image containing a person, regardless of whether there is a special intention, one habitually focuses on a face or another part of the person, and therefore the person is a salient target in the image.

Step S22: Detect the input image according to the AI information identification algorithm to obtain a salient target image, where the salient target image may be denoted as a second detection result.

The salient target image is a result detected by the AI information identification algorithm, and can accurately provide a contour of a target object. The AI information identification algorithm can find a target in which human eyes are most interested in the image, accurately segment the target, and retain edge information of the target.

Figure 4C:
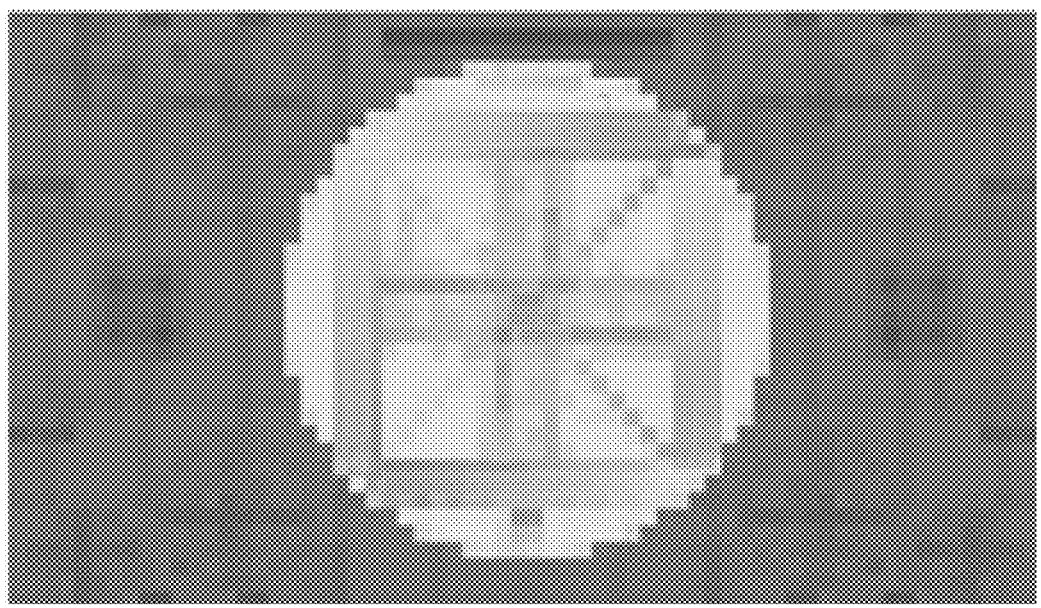
FIG. 4C is a schematic diagram of a second detection result obtained after the input image shown in FIG. 4A is detected according to an AI information identification algorithm.

In a feasible implementation, the input image may be input into the AI information identification algorithm model, to detect the salient target in the input image, extract the salient target, retain the edge information of the salient target, and output the salient target image. For example, the input image shown in FIG. 4A is processed according to the AI saliency detection algorithm model, and the output salient target image is shown in FIG. 4C. The AI-based salient target detection algorithm reduces a probability of an incomplete target and a probability of incorrectly marking a background as the salient region, and retains edge information of a salient target in an original image.

It may be understood that a salient region indicated by a salient image is different from the salient region indicated by the salient target image. The salient target image is a result detected by an AI-based saliency detection algorithm, and can accurately provide a contour of a salient target object.

Step S23: Determine a first weight value of a high luminance pixel in the first detection result and a second weight value of a high luminance pixel in the second detection result.

In a feasible implementation, statistics on a proportion value of the high luminance pixel in the first detection result may be collected to obtain the first weight value of the high luminance pixel; and statistics on a proportion value of the high luminance pixel in the second detection result may be collected to obtain the second weight value of the high luminance pixel. The proportion value of the high luminance pixel is a proportion of the high luminance pixel in total pixels.

Step S24: Adjust a weight value of the high luminance pixel based on the first weight value and the second weight value, to obtain the fused image.

In a feasible implementation, the second weight value of the high luminance pixel of the salient target image is adjusted based on the first weight value of the high lumi-nance pixel of the conventional salient image, to obtain the fused image, and the fused image is denoted as a third salient image.

In a feasible implementation, a proportion of the high luminance pixel of the salient target image may be adjusted based on the conventional salient image, a value of the adjusted proportion of the high luminance pixel is used as a weight, and the first detection result and the second detection result are fused to obtain the third salient image.

Figure 4D:
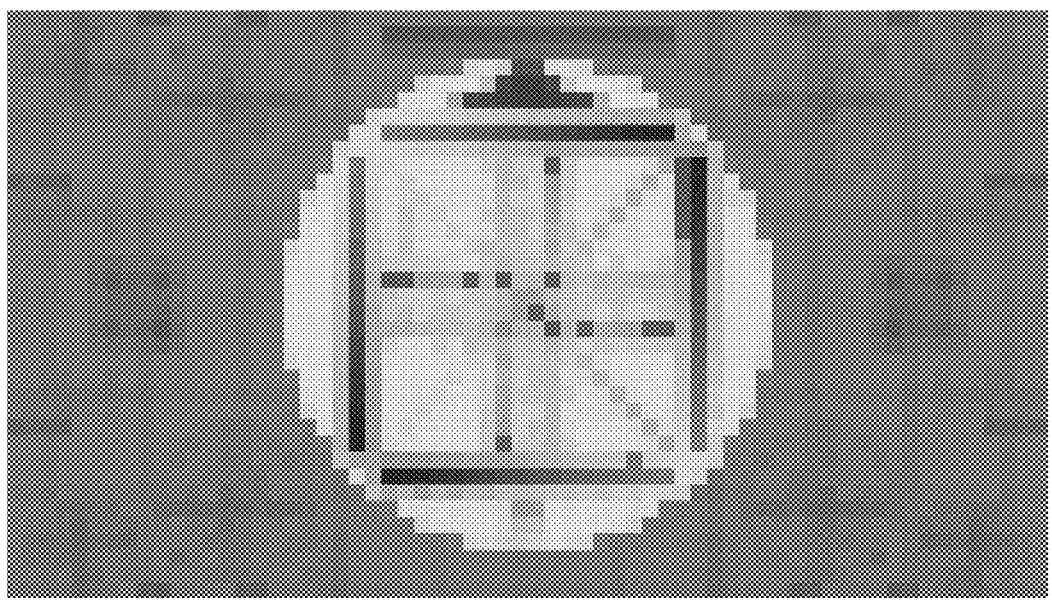
FIG. 4D is a schematic diagram of a fused image obtained after a first detection result and a second detection result are fused.

For example, the proportion of the high luminance pixel in the salient target image shown in FIG. 4C is adjusted, the adjusted proportion of the high luminance pixel is used as a fusion weight for fusing the conventional salient image shown in FIG. 4B and the salient target image shown in FIG. 4C, to obtain the third salient image shown in FIG. 4D. The third salient image is fused with the salient region in the conventional salient image and the salient region in the salient target image, and has a low-level feature of the target object in the input image, such as a color, an intensity, a direction, and the like, and an accurate contour of the target object.

Step S25: Identify the salient region and the non-salient region in the fused image. The step S25 includes the following steps S251 to S254.

Step S251: Determine the luminance distribution of the input image, where statistics on a luminance value of each pixel of the input image are collected, to obtain the luminance distribution.

For example, statistics on an RGB luminance value of each pixel of the input image may be collected, to obtain the luminance distribution.

RGB is a currently commonly used color information expression manner, and uses luminance of three primary colors of red (R), green (G), and blue (B) to quantify a color. Generally, R, G, and B each have 256 levels of luminance, and the levels are represented by numbers from 0, 1, 2, . . . , to 255.

For example, statistics on a YUV luminance value of each pixel of the input image may be alternatively collected, to obtain the luminance distribution.

YUV is a color encoding method used by the European television system. "Y" indicates a luminance (luminance or luma) value, that is, a grayscale value. "U" and "V" indicate chrominance (chrominance or chroma) that is used to describe an image color and saturation. When YUV color encoding is used, the luminance value Y is separated from the chrominance values U and V, so that even if without UV information, a complete image can be displayed based on luminance information (Y), and the image is black and white. Therefore, statistics on a luminance value Y of each pixel of the input image may be collected, to obtain the luminance distribution. The luminance value Y is represented by numbers from 0, 1, 2, . . . , to 255.

In a feasible implementation, the luminance distribution may be described by using a histogram.

Figure 5:
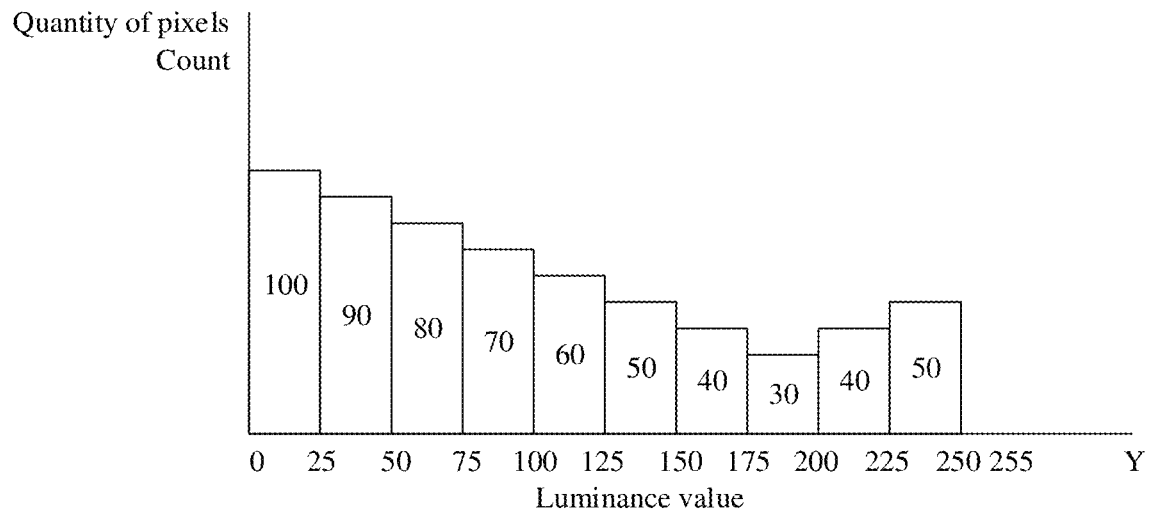
FIG. 5 is a histogram describing luminance distribution.

FIG. 5 is a histogram describing the luminance distribution. As shown in FIG. 5, a value on a horizontal-coordinate Y-axis indicates a luminance value, and a value on a vertical-coordinate Count-axis indicates a quantity of pixels corresponding to a specific luminance value. For example, FIG. 5 indicates that a quantity of pixels, of the input image, with a luminance value of 25 is 100, and a quantity of pixels with a luminance value of 75 is 80.

Step S252: Adjust a first salience value of each pixel of the fused image based on the luminance distribution of the input image to obtain a second salience value. The step S252 includes the following steps S2521 to S2523.

Step S2521: Perform weighted averaging based on the luminance distribution and a preset luminance-weight curve to obtain a salience gain-luminance distribution adjustment curve. The luminance distribution includes weight values of low, medium, and high luminance.

In a feasible implementation, the weight values of low, medium, and high luminance are first separately calculated based on the luminance distribution of the input image. The weight values of low, medium, and high luminance indicate a luminance distribution proportion of the input image.

For example, luminance weight distribution (low, medium, high) of an all-black image is (100, 0, 0), indicating that a proportion of low luminance pixels in the image is 100%; and weight distribution of low, medium, and high luminance of an all-white image is (0, 0, 100), indicating that a proportion of high luminance pixels in the image is 100%. The values are only examples, and constitute no limitation on a range.

For example, a pixel with a luminance value Y of YUV that is less than 50 may be classified as low luminance, a pixel with a luminance value Y that is from 50 to 200 may be classified as medium luminance, a pixel with a luminance value Y that is greater than 200 may be classified as high luminance. A maximum luminance value is 255. The values are only examples, and constitute no limitation on a range.

Then, weighted averaging is respectively performed based on the weight values of low, medium, and high luminance and three corresponding preset weight distribution curves, to obtain a salience value-luminance distribution adjustment curve that finally adapts to the input image.

Figure 6:
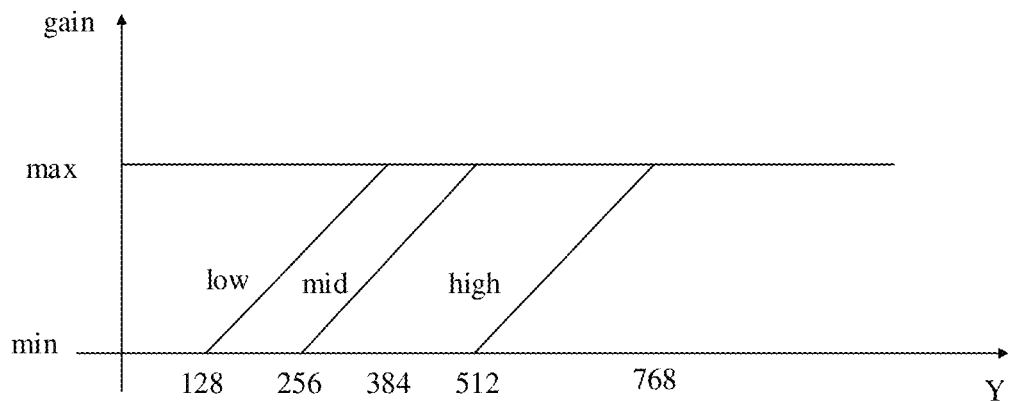
FIG. 6 is a tile diagram of three preset luminance weight distribution curves.

FIG. 6 is a tile diagram of the three preset weight distribution curves. As shown in FIG. 6, the preset low, mid, and high weight distribution curves are tiled in a same coordinate system, where a horizontal coordinate Y indicates a tiled luminance value, a vertical coordinate gain indicates a gain intensity for salience value adjustment, min means a minimum gain intensity, and max means a maximum gain intensity. Weighted averaging is respectively performed based on the three weight values of low, medium, and high luminance and the three corresponding preset low, medium, and high luminance weight distribution curves, for example:

$$LUT[Y] = W0*\text{low} + W1*\text{mid} + W2*\text{high} \quad (1)$$

In equation 1, LUT[Y] is a salience value-luminance distribution adjustment curve, W0 is a low luminance weight value, W1 is a medium luminance weight value, and W2 is a high luminance weight value. Based on equation 1, the salience value-luminance distribution adjustment curve LUT[Y] that finally adapts to the input image is obtained.

Figure 7:
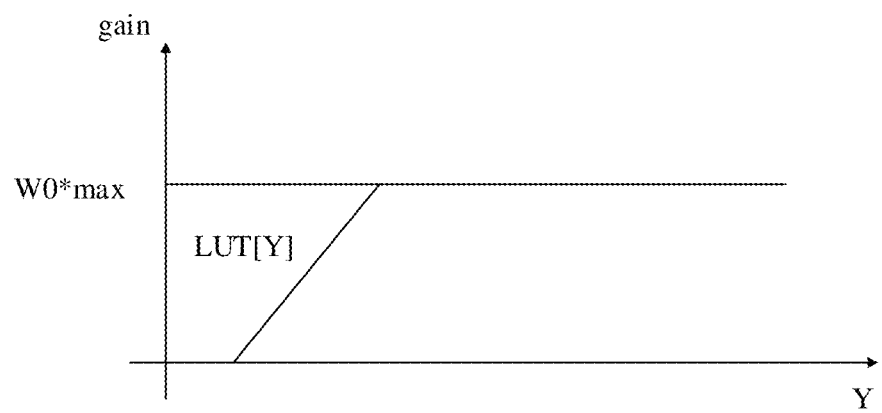
FIG. 7 is a schematic diagram of a salience value adjustment curve obtained after weighted averaging is performed on the three preset weight distribution curves shown in FIG. 6.

For example, the luminance weight distribution (low, medium, high) of the all-black image is (100, 0, 0), indicating that a proportion of an image part with a low luminance scene in the image is 100%, and weighted averaging is respectively performed based on the weight values and the three preset weight distribution curves shown in FIG. 6, to obtain the adjustment curve LUT[Y] shown in FIG. 7. A horizontal coordinate of the adjustment curve LUT[Y] indicates a luminance value Y, and a vertical coordinate indicates a gain intensity "gain" for salience value adjustment, where W0=100. The values are only examples, and constitute no limitation on a range.

Step S2522: Obtain a salience gain value of each pixel based on the salience gain-luminance distribution adjustment curve. The salience gain value is used to increase or decrease a salience value corresponding to each pixel. The salience value is a salient degree of a single pixel relative to the overall image.

In a feasible implementation, the adjustment curve LUT[Y] may be searched based on the luminance value of each pixel of the input image, to obtain a salience gain value corresponding to the luminance value of each pixel.

For example, a salience value of a black pixel of the all-black image is 0; and if a pixel of the image is white, a salience value of the pixel is 100. The values are only examples, and constitute no limitation on a range.

It may be understood that higher luminance contrast of one pixel relative to the other pixels of an overall image indicates a larger salience value of the pixel. On the contrary, lower luminance contrast of one pixel relative to the other pixels of an overall image indicates a smaller salience value of the pixel.

Step S2523: Increase or decrease the first salience value of each pixel of the fused image based on the salience gain value to obtain the second salience value of each pixel.

In a feasible implementation, based on the fused image, a salient degree of a single pixel relative to the overall image may be calculated, to obtain a salience value of each pixel of the image. The salience value is denoted as the first salience value. The adjustment curve LUT[Y] is searched based on the luminance value of each pixel of the input image, to obtain a salience gain value of each pixel. The first salience value of the corresponding pixel of the fused image is adjusted based on the gain value, to obtain the second salience value.

In a feasible implementation, the first salience value of the corresponding pixel of the third salient image may be adjusted based on the salience gain value to obtain the second salience value, and the second salience value of each pixel of the third salient image is obtained after the overall image is traversed.

Step S253: Add second salience values of a plurality of pixels in a specified region in the fused image together and calculate an average value to obtain a block salience value of the specified region, where there are a plurality of specified regions, and the specified region is a region corresponding to each backlight unit in the backlight module.

In a feasible implementation, a block salience value of each specified region may be obtained through calculation based on a zonal structure of the backlight module and the second salience value of each pixel of the fused image.

The zonal structure of the backlight module 14 includes a plurality of backlight units, and each backlight unit corresponds to a plurality of pixels of the image.

In a possible implementation, second salience values of all pixels of a plurality of pixels in one specified region may be added together to calculate an average value, to obtain a block salience value of the specified region, and a block salience value of a region corresponding to each backlight unit is obtained after the backlight module is traversed.

It may be understood that a plurality of pixels corresponding to each backlight unit have a same block salience value, and a plurality of pixels in each specified region have a same block salience value.

Step S254: Determine the salient region in the fused image based on the block salience value of the specified region, and determine the non-salient region based on the salient region in the fused image.

For example, a region with a block salience value less than 100 may be denoted as the non-salient region, and a region with a block salience value greater than 100 may be denoted as the salient region. The values are only examples, and constitute no limitation on a range.

In this way, the block salience value of the region corresponding to each backlight unit in the backlight module is calculated, and the salient region and the non-salient region in the input image may be distinguished based on the block salience value. In the following steps S12 to S14, the backlight power value is adaptively allocated to the salient region, so that the power value constraint can be satisfied, and the image quality performance of the salient region can be effectively improved, to show the content feature of the target image. The following describes steps S12 to S14 in detail.

Step S12 of collecting statistics on a pre-output first backlight power value of the backlight module based on the input image is performed. The step may include the following step S301 to step S303.

Step S301: Initialize the backlight module 14 during power-on to obtain the input image.

Step S302: Collect the luminance value of each pixel of the input image, and separately collect, based on a zonal status of the backlight module 14, statistics on a total luminance value of all pixels in a region corresponding to each backlight unit, to obtain a backlight power value corresponding to each backlight unit.

In a possible implementation, the zonal structure of the backlight module 14 includes a plurality of backlight units, each backlight unit includes a plurality of pixels in a corresponding region in the input image, and luminance values of a plurality of pixels in a region corresponding to one backlight unit are added together, to obtain a total luminance value of the backlight unit.

Step S303: Collect statistics on the backlight power value of each backlight unit to obtain the pre-output total backlight power value of the backlight module 14, and denote the pre-output total backlight power value as the first backlight power value.

Figure 8:
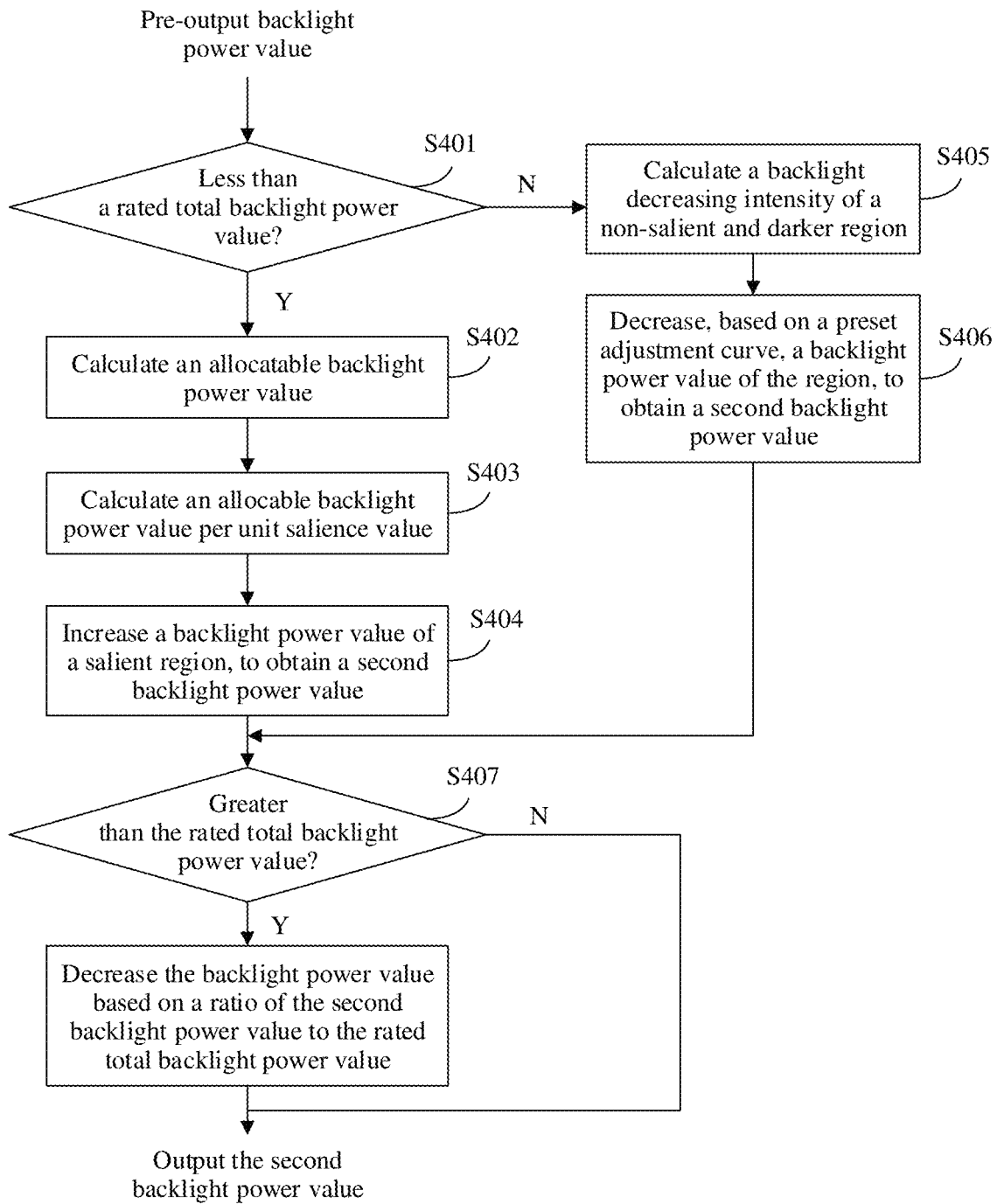
FIG. 8 is a flowchart of dynamically adjusting a backlight power value of each backlight unit based on a block salience value in a backlight display control method according to an embodiment of this application.

FIG. 8 is a flowchart of dynamically adjusting the backlight power value of each backlight unit based on the block salience value in the backlight display control method according to an embodiment of this application. As shown in FIG. 8, a procedure of step S13 includes the following steps S401 to S407.

Step S401: Compare the pre-output total backlight power value with the rated total backlight power value, and if the pre-output total backlight power value is less than the rated total backlight power value, perform steps S402 to S404, or if the pre-output total backlight power value is greater than the rated total backlight power value, perform steps S405 to S406.

Step S402: Subtract the pre-output total backlight power value from the rated total backlight power value to obtain the remaining power value.

For example, if the pre-output total backlight power value is 300 W, and the rated total backlight power value is 350 W, an allocable backlight power value is: 350 W−300 W=50 W.

Step S403: Obtain a sum of block salience values of all backlight units in the third salient image through calculation, to obtain an allocable backlight power value per unit salience value.

For example, a sum, 25, of the block salience values of all backlight units corresponding to the third salient image is obtained through calculation, and the allocable backlight power value per unit salience value is: 50 W/25=2 W.

Step S404: Multiply the allocable backlight power value per unit salience value by a block salience value of each backlight unit, to obtain a backlight increment of each backlight unit, and add the backlight increment and the pre-output total backlight power value together, to obtain an adjusted total backlight power value.

For example, it is assumed that only three backlight units in the backlight module 14 are projected to the salient region corresponding to the input image, a block salience value of a first backlight unit is 5, a block salience value of a second backlight unit is 8, and a block salience value of a third backlight unit is 12. In this case, a backlight increment of the first backlight unit is: 2*5=10 W, a backlight increment of the second backlight unit is: 2*8=16 W, and a backlight increment of the third backlight unit is: 2*12=24 W. A total backlight increment and the pre-output total backlight power value are added together to obtain an adjusted total backlight power value, and the adjusted total backlight power value is: 300 W+10 W+16 W+24 W=350 W.

Step S405: If the pre-output total backlight power value is greater than the rated total backlight power value, obtain a backlight decreasing intensity of each backlight unit through calculation based on the block salience value of each backlight unit and an average luminance value of each backlight unit.

In a possible implementation, the following steps may be performed for obtaining the backlight decreasing intensity of each backlight unit through calculation based on the block salience value of each backlight unit and the average luminance value of each backlight unit.

Figure 9A:
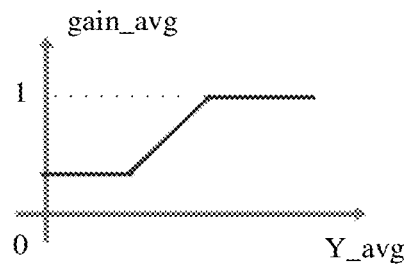
FIG. 9A is a schematic diagram of a first preset curve in a backlight display control method according to an embodiment of this application.

Step S4051: Search, based on an average luminance value corresponding to each backlight unit in the input image, a first preset curve shown in FIG. 9A to obtain a luminance gain value gain_avg, where the luminance gain value indicates a degree to which luminance decreases. The first preset curve is a luminance-luminance gain value adjustment curve.

Figure 9B:
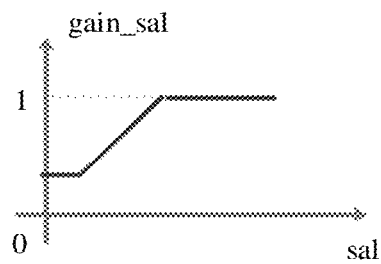
FIG. 9B is a schematic diagram of a second preset curve in a backlight display control method according to an embodiment of this application.

Step S4052: Search, based on the block salience value of each backlight unit, a second preset curve shown in FIG. 9B to obtain a salience gain value gain_sal, where the salience gain value indicates a degree to which salience decreases. The second preset curve is a salience value-salience gain value adjustment curve.

Step S4053: Calculate the backlight decreasing intensity of each backlight unit based on the luminance gain value and the salience gain value: Gain=gain_avg*gain_sal. The backlight decreasing intensity indicates a degree to which the backlight power value decreases.

Step S406: Decrease, based on the backlight decreasing intensity and a backlight adjustment value, the backlight power value of the non-salient region, and maintain the backlight power value of the salient region, to obtain the second backlight power value pre-output by the backlight module.

In a possible implementation, step S406 includes the following steps.

Figure 9C:
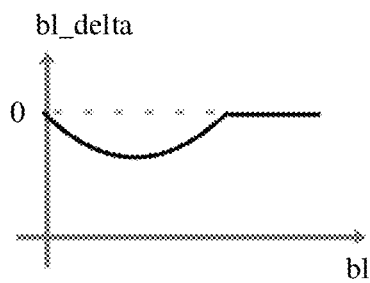
FIG. 9C is a schematic diagram of a third preset curve in a backlight display control method according to an embodiment of this application.

Step S4061: Search, based on the backlight power value bl of each backlight unit, a third preset curve shown in FIG. 9C, to obtain the backlight adjustment value bl_delta, where the third preset curve is a backlight power value-backlight gain value adjustment curve.

Step S4062: Obtain the adjusted total backlight power value through calculation based on the backlight adjustment value bl_delta and the backlight decreasing intensity Gain: Bl_new=bl+bl_delta*Gain.

Step S4063: Decrease the backlight power value of the non-salient region to Bl_new.

Step S4064: Obtain, based on backlight power values bl_delta of a plurality of salient regions and the adjusted backlight power value Bl_new of the non-salient region, the second backlight power value pre-output by the backlight module.

Step S407: Compare the second backlight power value with the rated total backlight power value again, and if the second backlight power value is greater than the rated total backlight power value, decrease the backlight power value of each backlight unit proportionally based on a ratio of the second backlight power value to the rated total backlight power value; or if the adjusted total backlight power value is less than or equal to the rated total backlight power value, output the second backlight power value.

Finally, backlight of a corresponding backlight unit of the backlight module is enabled based on the second backlight power value.

Based on the backlight display control method provided in embodiments of this application, the region of interest for human eyes is effectively identified based on the AI detection information, and with reference to the conventional saliency detection technology, the backlight power value is adaptively allocated to adjust the pre-output backlight power value of the backlight module. When the pre-output backlight power value is less than the rated backlight power value, the contrast of the salient region is improved to improve the image quality performance. When the pre-output backlight power value is greater than the rated backlight power value, the luminance of the non-salient region is reduced to maintain the performance of the salient region. This minimizes the image quality loss that can be perceived by human eyes. By using the backlight display control method provided in embodiments of this application, the backlight module can improve the contrast of the region of interest under the power value constraint, to improve the image quality experience.

Based on the method in the foregoing embodiments, an embodiment of this application provides a backlight display control apparatus, including: an image post-processing module, configured to: obtain a fused image based on an input image, and identify a salient region and a non-salient region in the fused image; and a power consumption control module, configured to increase a backlight power value of the salient region and/or decrease a backlight power value of the non-salient region.

The image post-processing module includes: a region identification unit, configured to: determine luminance distribution of the input image; adjust a first salience value of each pixel of the fused image based on the luminance distribution to obtain a second salience value; add second salience values of a plurality of pixels in a specified region in the fused image together and calculate an average value to obtain a block salience value of the specified region, where the specified region is a region corresponding to each backlight unit in a backlight module, and there are a plurality of specified regions; determine the salient region in the fused image based on the block salience value of the specified region; and determine the non-salient region based on the salient region in the fused image.

The power consumption control module includes: a first backlight statistics collection unit, configured to obtain a first backlight power value based on the luminance distribution of the input image; a first control unit, configured to: in a case in which the first backlight power value is less than a rated total backlight power value, add a remaining power value to the salient region, where the remaining power value is a difference between the first backlight power value and the rated total backlight power value; and a second control unit, configured to: in a case in which the first backlight power value is greater than the rated total backlight power value, decrease the backlight power value of the non-salient region and maintain the backlight power value of the salient region.

The power consumption control module further includes: a second backlight statistics collection unit, configured to determine a second backlight power value; and a third control unit, configured to: in a condition in which the second backlight power value is greater than the rated backlight power value, decrease the backlight power value of the non-salient region based on a ratio of the second backlight power value to the rated backlight power value.

Based on the method in the foregoing embodiments, an embodiment of this application provides an electronic device, including: at least one memory, configured to store a program; at least one processor, configured to execute the program stored in the memory; and a backlight module, configured to enable backlight, where the backlight module is connected to the processor through a transmission interface, and the backlight module includes a plurality of backlight units; and when the program stored in the memory is executed, the processor is configured to perform the method according to any one of the foregoing embodiments, so that the plurality of backlight units enable backlight in a corresponding region.

Based on the method in the foregoing embodiments, an embodiment of this application provides a computer storage medium, where the computer storage medium stores instructions, and when the instructions are run on a computer, the computer is enabled to perform the method according to any one of the foregoing embodiments.

Based on the method in the foregoing embodiments, an embodiment of this application provides a computer program product including instructions, where when the instructions are run on a computer, the computer is enabled to perform the method according to any one of the foregoing embodiments.

Based on the method in the foregoing embodiments, an embodiment of this application provides a backlight display control apparatus, including a processor and a transmission interface, where the processor receives or sends data through the transmission interface; and the processor is configured to invoke program instructions stored in a memory, to enable the control apparatus to implement the method according to any one of the foregoing embodiments.

A person of ordinary skill in the art may be aware that in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

In addition, aspects or features in embodiments of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, a magnetic tape, or the like), an optical disc (for example, a compact disc (CD), a digital versatile disc (DVD), or the like), a smart card, and a flash memory component (for example, an erasable programmable read-only memory (EPROM), a card, a stick, a key drive, or the like). In addition, various storage media described in this specification may indicate one or more devices and/or other machine-readable media that are configured to store information. The term "machine-readable media" may include but is not limited to a radio channel, and other various media that can store, include and/or carry instructions and/or data.

It should be understood that in various embodiments of this application, sequence numbers of the foregoing processes do not mean execution sequences. The execution sequences of the processes should be determined based on functions and internal logic of the processes, and should not be construed as any limitation on the implementation processes of embodiments of this application.

It may be clearly understood by a person skilled in the art that for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiment is merely an example. For example, unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in an electrical, a mechanical, or another form.

Units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of embodiments.

When the functions are implemented in a form of a software functional unit and sold or used as an independent product, the functions may be stored in a computer-readable storage medium. Based on such an understanding, the technical solutions of embodiments of this application essentially, or the part contributing to the conventional technology, or some of the technical solutions may be implemented in a form of a software product. The computer software product is stored in a storage medium, and includes several instructions for instructing a computer device (which may be a personal computer, a server, an access network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, an optical disc, or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A backlight display control method, wherein-the-method comprising:
    obtaining a fused image based on an input image;
    identifying a salient region and a non-salient region in the fused image;
    increasing a backlight power value of the salient region; and/or
    decreasing a backlight power value of the non-salient region,
    wherein the obtaining a fused image based on an input image comprises;
    detecting the input image according to a saliency detection algorithm to obtain a first detection result;
    detecting the input image according to an artificial intelligence (AD information identification algorithm to obtain a second detection result; and
    obtaining the fused image based on the first detection result and the second detection result, and
    wherein the obtaining the fused image based on the first detection result and the second detection result comprises:
    determining a first weight value of a high luminance pixel in the first detection result;
    determining a second weight value of a high luminance pixel in the second detection result, and
    adjusting a weight value of a high luminance pixel based on the first weight value and the second weight value, to obtain the fused image.

2. The backlight display control method according to claim 1, wherein the detecting the input image according to a saliency detection algorithm to obtain a first detection result comprises:
    detecting low-level prior information and/or high-level prior information in the input image according to the saliency detection algorithm, and outputting the first detection result, wherein the low-level prior information comprises at least one of: contrast prior information or spatial location prior information, and the high-level prior information comprises at least one of: a human face, a text, or an object.

3. The backlight display control method according to claim 2, wherein the detecting the input image according to an AI information identification algorithm to obtain a second detection result comprises:
    detecting a salient target in the input image according to the AI information identification algorithm, segmenting the salient target, and retaining edge information of the salient target, to obtain the second detection result.

4. The backlight display control method according to claim 1, wherein the identifying a salient region and a non-salient region in the fused image comprises:
    determining luminance distribution of the input image;
    adjusting a first salience value of each pixel of the fused image based on the luminance distribution to obtain a second salience value;
    adding second salience values of a plurality of pixels in a specified region in the fused image together and calculating an average value to obtain a block salience value of the specified region, wherein the specified region is a region corresponding to each backlight unit in a backlight module, and there are a plurality of specified regions;

determining the salient region in the fused image based on the block salience value of the specified region; and determining the non-salient region based on the salient region in the fused image.

5. The backlight display control method according to claim 4, wherein the adjusting a first salience value of each pixel of the fused image based on the luminance distribution to obtain a second salience value comprises:

determining the luminance distribution of the input image;

performing weighted averaging based on the luminance distribution and a preset luminance-weight curve to obtain a salience gain-luminance distribution adjustment curve, wherein the luminance distribution comprises weight values of low, medium, and high luminance;

obtaining a salience gain value of each pixel based on the salience gain-luminance distribution adjustment curve, wherein the salience gain value is used to increase or decrease a salience value of each pixel, and the salience value of each pixel is a salient degree of a single pixel relative to the input image; and increasing or decreasing the first salience value of each pixel of the fused image based on the salience gain value to obtain the second salience value of each pixel.

6. The backlight display control method according to claim 5, wherein the increasing a backlight power value of the salient region comprises:

determining a first backlight power value based on the input image; and in a case in which the first backlight power value is less than a rated total backlight power value, adding a remaining power value to the salient region, wherein the remaining power value is a difference between the first backlight power value and the rated total backlight power value.

7. The backlight display control method according to claim 6, wherein the decreasing a backlight power value of the non-salient region comprises:

determining the first backlight power value based on the input image; and in a case in which the first backlight power value is greater than the rated total backlight power value, decreasing the backlight power value of the non-salient region, and maintaining the backlight power value of the salient region.

8. The backlight display control method according to claim 7, wherein the determining a first backlight power value based on the input image comprises:

determining the first backlight power value based on a sum of current backlight power values of the input image.

9. The backlight display control method according to claim 7, wherein the decreasing a backlight power value of the non-salient region comprises:

obtaining a luminance gain value based on an average luminance value of the input image and a first preset curve, wherein the first preset curve is a luminance-luminance gain value adjustment curve;

obtaining the salience gain value based on the block salience value of the input image and a second preset curve, wherein the second preset curve is a salience value-salience gain value adjustment curve;

determining a backlight decreasing intensity based on the luminance gain value and the salience gain value;

obtaining a backlight adjustment value based on a current backlight power value of the non-salient region and a third preset curve, wherein the third preset curve is a backlight power value-backlight gain value adjustment curve; and decreasing the backlight power value of the non-salient region based on the backlight adjustment value and the backlight decreasing intensity.

10. The backlight display control method according to claim 9, wherein the decreasing a backlight power value of the non-salient region comprises:

determining a second backlight power value; and in a condition in which the second backlight power value is greater than the rated total backlight power value, decreasing the backlight power value of the non-salient region based on a ratio of the second backlight power value to the rated backlight power value.

11. A backlight display control apparatus, comprising a processor and a transmission interface, via which the processor receives or sends data; and the processor is configured to invoke program instructions stored in a memory, to enable the backlight display control apparatus to implement the backlight display control method according to claim 1.

12. An electronic device, comprising:

at least one memory, configured to store a program;

at least one processor, configured to execute the program stored in the memory; and a backlight module, configured to enable backlight, wherein the backlight module is connected to the processor through a transmission interface, and the backlight module comprises a plurality of backlight units; and when the program stored in the memory is executed, the at least one processor is configured to perform the method according to claim 1, so that the plurality of backlight units enable backlight in a corresponding region.

13. A non-transitory computer storage medium, wherein the computer storage medium stores instructions, and when the instructions are run on a computer, the computer is enabled to perform the method according to claim 1.

14. A non-transitory computer program product comprising instructions, wherein when the instructions are run on a computer, the computer is enabled to perform the method according to claim 1.

15. A backlight display control apparatus, comprising:

an image post-processing processor, configured to: obtain a fused image based on an input image, and identify a salient region and a non-salient region in the fused image; and a power consumption controller, configured to increase a backlight power value of the salient region and/or decrease a backlight power value of the non-salient region, wherein the image post-processing processor is further configured to:

detect the input image according to a saliency detection algorithm to obtain a first detection result;

detect the input image according to an artificial intelligence (AD) information identification algorithm to obtain a second detection result; and obtain the fused image based on the first detection result and the second detection result, wherein the image post-processing processor is further configured to:

determine luminance distribution of the input image;

adjust a first salience value of each pixel of the fused image based on the luminance distribution to obtain a second salience value;

add second salience values of a plurality of pixels in a specified region in the fused image together and calculate an average value to obtain a block salience value of the specified region, wherein the specified region is a region corresponding to each backlight unit in a backlight module, and there are a plurality of specified regions;

determine the salient region in the fused image based on the block salience value of the specified region; and determine the non-salient region based on the salient region in the fused image.

16. The backlight display control apparatus according to claim 15, wherein the power consumption controller is further configured to:

obtain a first backlight power value based on the luminance distribution of the input image;

in a case in which the first backlight power value is less than a rated total backlight power value, add a remaining power value to the salient region, wherein the remaining power value is a difference between the first backlight power value and the rated total backlight power value; and in a case in which the first backlight power value is greater than the rated total backlight power value, decrease the backlight power value of the non-salient region and maintain the backlight power value of the salient region.

17. The backlight display control apparatus according to claim 16, wherein the power consumption controller is further configured to:

determine a second backlight power value; and in a condition in which the second backlight power value is greater than the rated backlight power value, decrease the backlight power value of the non-salient region based on a ratio of the second backlight power value to the rated backlight power value.

* * * * *

UNITED STATES PATENT AND TRADEMARK OFFICE
CERTIFICATE OF CORRECTION

| | | |
|---|---|---|
| PATENT NO. | : 12,334,026 B2 | Page 1 of 1 |
| APPLICATION NO. | : 18/604703 | |
| DATED | : June 17, 2025 | |
| INVENTOR(S) | : Wenlin Hu | |

It is certified that error appears in the above-identified patent and that said Letters Patent is hereby corrected as shown below:

In the Claims

Column 20, Claim 1, Line 25, change "(AD" to --(AI)--; and

Column 22, Claim 15, Line 66, change "(AD" to --(AI)--.

Signed and Sealed this
Fifteenth Day of July, 2025

Coke Morgan Stewart
*Acting Director of the United States Patent and Trademark Office*